(12) United States Patent
Lippman et al.

(10) Patent No.: US 9,919,621 B2
(45) Date of Patent: Mar. 20, 2018

(54) VEHICLE 2ND AND 3RD ROW SEAT ADJUSTMENT BASED ON ANTHROPOMETRIC CHARACTERISTICS OF 2ND AND 3RD ROW REAR PASSENGER

(71) Applicant: Ford Global Technologies, LLC, Dearborn, MI (US)

(72) Inventors: Mark Allan Lippman, New Baltimore, MI (US); Allan Roy Gale, Livonia, MI (US); Mangala A. Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/854,166

(22) Filed: Sep. 15, 2015

(65) Prior Publication Data

US 2017/0072816 A1 Mar. 16, 2017

(51) Int. Cl.
*B60N 2/02* (2006.01)
*B60N 2/20* (2006.01)

(52) U.S. Cl.
CPC ............ *B60N 2/0244* (2013.01); *B60N 2/20* (2013.01); *B60N 2002/0268* (2013.01)

(58) Field of Classification Search
CPC . B60N 2/0244; B60N 2/20; B60N 2002/0268
USPC ........................................................ 701/49
See application file for complete search history.

(56) References Cited

U.S. PATENT DOCUMENTS

| 8,437,919 | B2 | 5/2013 | Wang et al. | |
|---|---|---|---|---|
| 8,958,955 | B2 | 2/2015 | Hotary et al. | |
| 2007/0290554 | A1* | 12/2007 | Teshima | B60N 2/0244 307/10.1 |
| 2008/0218381 | A1* | 9/2008 | Buckley | B60Q 1/50 340/932.2 |
| 2012/0053794 | A1 | 3/2012 | Alcazar et al. | |
| 2013/0329960 | A1 | 12/2013 | Sandahl et al. | |
| 2015/0084985 | A1 | 3/2015 | Baudu | |
| 2016/0280161 | A1 | 9/2016 | Lippman et al. | |

FOREIGN PATENT DOCUMENTS

DE 102009040995 A1 4/2010
JP 2009046026 A 3/2009

* cited by examiner

*Primary Examiner* — Maceeh Anwari
(74) *Attorney, Agent, or Firm* — Frank A. MacKenzie; Brooks Kushman P.C.

(57) ABSTRACT

A method may be performed by a sensor arrangement and a controller. The method may include capturing, by the sensor arrangement, data indicative of anthropometric characteristics of an expected 3rd row passenger prior to the passenger entering a vehicle. The method may also include deploying, by a controller, a 3rd row seat and moving a 2nd row seat prior to the expected 3rd row passenger entering the vehicle to a riding position that is based on the characteristics and 2nd row passenger data. The sensor arrangement may include an optical sensor arrangement such as used in a blind-spot detection system for a vehicle.

17 Claims, 3 Drawing Sheets

VEHICLE 2ND AND 3RD ROW SEAT ADJUSTMENT BASED ON ANTHROPOMETRIC CHARACTERISTICS OF 2ND AND 3RD ROW REAR PASSENGER

TECHNICAL FIELD

This application is generally related to adjusting a riding position of a 2nd or 3rd row rear seat of a vehicle based on anthropometric characteristics of a an expected passenger.

BACKGROUND

A primary goal in the design of automotive vehicle interiors is to achieve a comfortable and safe seating position for vehicle occupants in which the occupants may have a wide range of body sizes and types. Many different types of adjustable seat mechanisms are available, and seats in which translation motion and seat back tilt is powered by electric motors are common. Also, the use of memory seat modules in which multiple preset positions are stored in memory such that a single press of a button will adjust a seat and seat back according to the preset data is common. These adjustments focus on the driver and driver preferences to set seat position such as the seat height, forward/rear position, seat bottom angle, and seat back angle. Typically, limited space is available in the passenger compartments of most vehicles, and particularly in the 3rd row seat.

SUMMARY

A blind-spot detection system for a vehicle may include an optical sensor arrangement and at least one controller. The optical sensor arrangement may be configured to capture data indicative of, while the vehicle is moving, objects alongside the vehicle and, while the vehicle is stopped, an expected 3rd row passenger before the passenger enters the vehicle. The at least one controller may be configured to move a 2nd row seat to a riding position based on anthropometric characteristics of the passenger that are derived from the data.

A method may be performed by a sensor arrangement and a controller. The method may include capturing, by the sensor arrangement, data indicative of anthropometric characteristics of an expected 3rd row passenger prior to the passenger entering a vehicle. The method may also include deploying, by a controller, a 3rd row seat and moving a 2nd row seat prior to the expected 3rd row passenger entering the vehicle to a riding position that is based on the characteristics and 2nd row passenger data.

A vehicle includes a blind-spot detection system and a controller. The blind-spot detection system may be configured to output an alert in response to an object being detected alongside the vehicle while in motion, and to output data about an expected 3rd row passenger about to enter the vehicle. The controller may be configured to deploy a $3^{rd}$ row seat and move a 2nd row seat to a riding position based on anthropometric characteristics of the passenger that are derived from the data.

DETAILED DESCRIPTION

Figure 1:
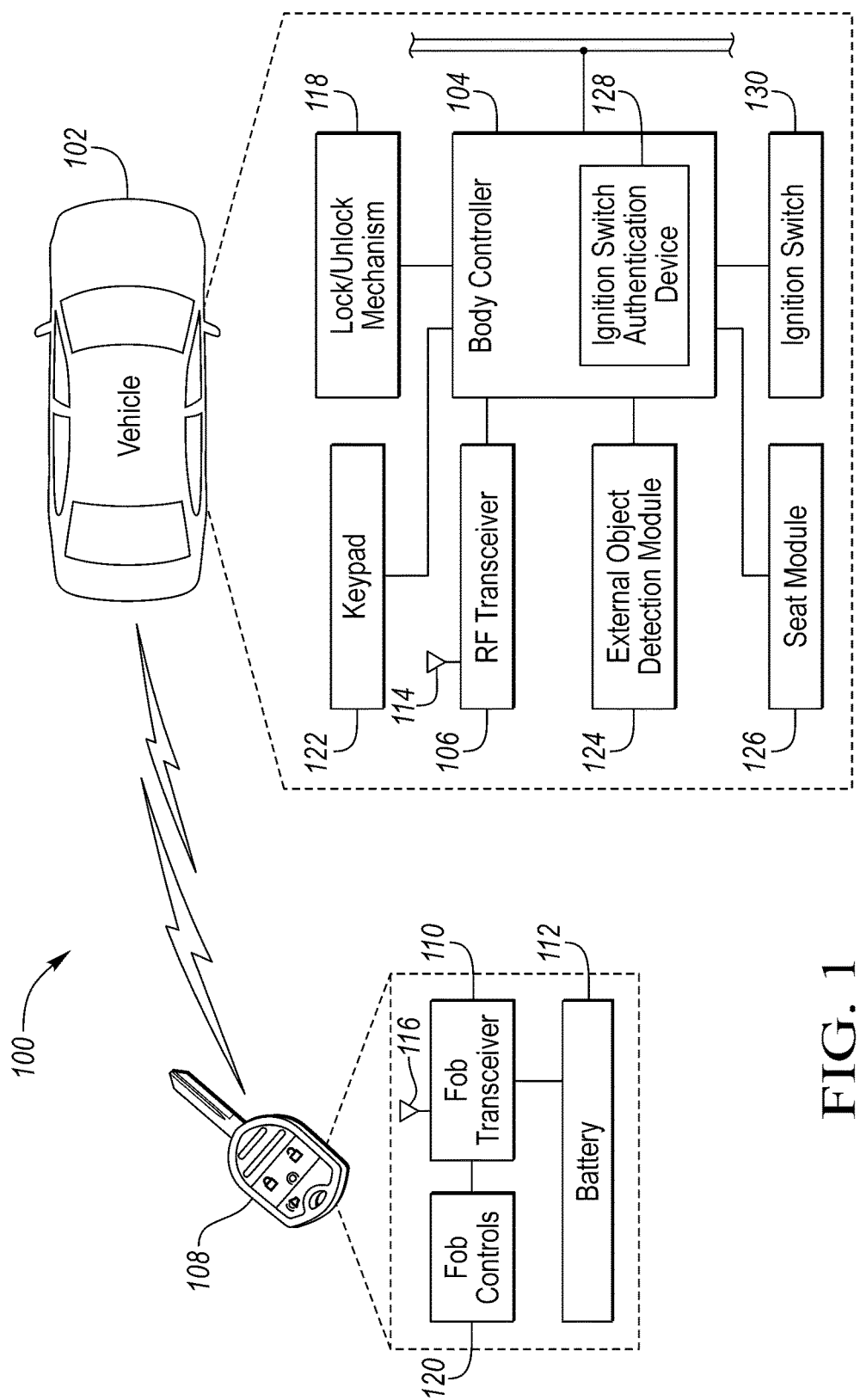
FIG. 1 illustrates an exemplary keyless entry system for a vehicle including an external object detection module and seat module.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Some vehicles include a keyless entry system, an external object detection module, and at least one seat module. The keyless entry system may include a key fob having a RF transmitter and a RF receiver mounted in the vehicle. The key fob and RF receiver are configured to communicate with each other. The communication may include a handshake and access authentication. Upon authentication, select modules in the vehicle may wake up or become activated. Here, an external object detection module (EODM) such as a pedestrian detection system, a blind spot information system, a park-assist system, a back-up assistance system, or a cross traffic alert system may be activated in response to a signal from the key fob received by the RF receiver. Upon activation, data such as physical characteristics of an expected driver, $1^{st}$ row seat passenger, $2^{nd}$ row seat passenger and $3^{rd}$ row seat passenger may be gathered by the EODM. Typically, a 2nd row seat is adjusted solely based on a 2nd row seat passenger's desired position. Here, the 2nd row seat position is adjusted according to the data gathered by the EODM. The EODM data may be the expected 2nd row seat passenger's physical characteristics compensated by the characteristics of the expected $3^{rd}$ row seat passenger. Or in an alternative embodiment, The EODM data may be the physical characteristics of the expected $1^{st}$ row, $2^{nd}$ row and $3^{rd}$ row seat passenger. Here, a controller or module adjusts the 2nd row seat such that the position of the driver's preference and physical characteristics are of primary concern, then the physical characteristics of the expected $2^{nd}$ row and $3^{rd}$ row seat passengers are used to adjust the $2^{nd}$ row seat to a compensated position. Also, the EODM may determine a number of expected passengers on the side of the vehicle and the controller may activate a $3^{rd}$ row power folding seat module to deploy the $3^{rd}$ row seat in anticipation of a $3^{rd}$ row seat passenger. Also, the controller may fold a power folding $2^{nd}$ row seat so that the $3^{rd}$ row passenger has easy access to the $3^{rd}$ row seat. Typically $2^{nd}$ and $3^{rd}$ row seats are moved to aid in ingress and egress. As sensor technology and computing performance of vehicle modules increase, vehicle modules may be configured to perform increased tasks. One such task is adjustment of a $2^{nd}$ or $3^{rd}$ row seat to a riding position based on sensor input. A riding position of a seat is a position of a seat used by a passenger while the vehicle including the seat is in motion. The riding position may be determined based on anthropometric characteristics of some or all expected passengers. For example, the detection of a tall individual expected to be a $3^{rd}$ row passenger may result in the controller moving a $2^{nd}$ row seat forward to accommodate longer legs and larger feet. The movement of the $2^{nd}$ row seat may also be based on a position of a $1^{st}$ row seat, such as the driver's seat, and the sizes of expected $2^{nd}$ and $3^{rd}$ row passengers.

The compensated position may be determined by different strategies including feedback developed by human participant testing and cabin space calculations based on the optimal seat positions for safety and comfort. For example, human testing can include several individuals of differing physical attributes providing feedback on seat position adjustment preference when there is a third row seat. This feedback can include data such as multiple combinations of occupants having different leg and torso lengths. The data may be based on diverse occupant anthropometric characteristics in which occupants having different anthropometric characteristics are situated in the $1^{st}$ row seat, 2nd row seat and 3rd row seat. This information can be used to create a look-up table to determine the most likely compensated position for the data gathered by the EODM about the anthropometric characteristics of both an expected $1^{st}$ and 2nd row seat passenger and an expected 3rd row seat passenger seated behind the 2nd row seat passenger. In another example, data collected from computer models, crash testing or real world vehicle collision data can be used to create a look-up table of the position most likely to be optimal for safety and comfort.

FIG. 1 illustrates an exemplary keyless entry system 100 for a vehicle 102 including a keypad 122, a seat module 126 and an external object detection module (EODM) 124. The system 100 may include a body controller 104 having a radio frequency (RF) transceiver 106. A key fob 108 may be in communication with the RF transceiver 106 of the controller 104 utilizing a fob transceiver 110 powered by a battery 112.

An antenna 114 of the RF transceiver 106 may receive RF signals from an antenna 116 of the fob transceiver 110, and may deliver the signals to the RF transceiver 106. An unlock/lock mechanism 118 is operably coupled to the controller 104. The controller 104 is configured to control the unlock/lock mechanism 118 to unlock/lock doors of the vehicle 102 in response to the RF signals transmitted by the key fob 108. Power window actuators (not shown) may also be operably coupled to the controller 104, such that the controller 104 is configured to cause the various windows (e.g., front and rear door power windows, powered window side vents, power sunroofs and moon-roofs) of the vehicle 102 to open or close. The key fob 108 may include one or more fob controls 120, such as a lock switch and an unlock switch. Accordingly, the controller 104 controls the unlock/lock mechanism 118 to lock the doors of the vehicle 102 in response to a user depressing a lock fob control 120 of the key fob 108, and to unlock the doors of the vehicle 102 in response a signal based on the user depressing an unlock fob control 120 of the key fob 108. The key fob 108 may also periodically transmit a signal that may wake up vehicle modules including the controller 104 and further be used to unlock doors or activate other modules in the vehicle.

The keypad 122 is in electrical communication with the controller 104. The keypad 122 may be positioned on an exterior portion or section of the vehicle 102. The keypad 122 may include a touchpad configured to receive user input. The keypad 122 may wake-up the controller 104 and other modules in the vehicle upon a key on the keypad being pressed.

In an example, the keypad 122 may transmit commands via hardwired signals to the controller 104 responsive to the user interacting with the keypad 122. In another example, the keypad 122 may transmit commands via RF signals to the controller 104. The controller 104 may control some vehicle features including the door unlock/lock mechanism 118, lift gate operation, engine ignition 130 and window movement mechanism. The unlock/lock mechanism 118 unlocks/locks the doors in response to receiving the commands, e.g., two or more signals (RF or hardwired) which correspond to a valid sequence of alpha, numeric, or alphanumeric characters. Activation of the ignition switch 130 may power up vehicle modules including the EODM 124 and seat modules such as a driver seat module, a passenger seat module, a heated ventilated seat module, power folding seat module or rear seat module.

The key fob 108 may be implemented in connection with a base remote entry system, a passive entry passive start (PEPS) system or a passive anti-theft system (PATS). With the PEPS system, the controller 104 may control the unlock/lock mechanism 118 to unlock the door in response to the controller 104 determining that the key fob 108 is a predetermined distance away from the vehicle 102. In such a case, the key fob 108 automatically (or passively) transmits encrypted RF signals (e.g., without user intervention) in order for the controller 104 to decrypt (or decode) the RF signals and to determine if the key fob 108 is within the predetermined distance and are authorized. It is to be noted that with the PEPS implementation, the key fob 108 also generates RF signals which correspond to encoded lock/unlock signals in response to a user depressing a lock fob control 120 or an unlock fob control 120. In addition, with the PEPS system, a key may not be needed to start the vehicle 102. The user in this case may be required to depress the brake pedal switch or perform some predetermined operation prior to depressing a start switch after the user has entered into the vehicle 102. In the PATS implementation, the key fob 108 may operate as a conventional key fob in order to unlock/lock the vehicle 102. With the PATS implementation, a key (not shown) is generally needed to start the vehicle 102. The key may include a RF transmitter embedded therein to authenticate the key to the vehicle 102.

The controller 104 includes an ignition switch authentication device 128. The ignition switch authentication device 128 may also include an RF receiver (not shown) and an antenna (not shown) for receiving RF signals transmitted by the RF transmitters of the keys. It should be noted that the ignition switch authentication device 128 may be implemented as a standalone controller (or module). The ignition switch authentication device 128 is configured to authenticate the particular type of mechanism used to start the vehicle 102. For example, with the PATS implementation, the key is inserted into an ignition switch 130 to start the vehicle 102. In such a case, the RF transmitter of the key transmits RF signals having encrypted data therein to the receiver of the ignition switch authentication device 128. The ignition switch authentication device 128 decrypts the data to authenticate the key prior to allowing the user to start the vehicle 102.

With the PEPS implementation, as noted above, a key is not needed to start the vehicle 102. In such a case, the ignition switch authentication device 128 authenticates the RF encrypted data passively transmitted by the transmitter 108 to allow the user to start the engine of the vehicle 102. As noted above, in addition to the authentication device 128 authenticating the RF encrypted data, the user may perform a predetermined operation (e.g., pull handle of a door, or open door, toggle the brake pedal switch, or other operation) prior to depressing a start switch to start the vehicle 102. The system 100 contemplates a number of other operations from those listed prior to depressing the start switch to start the vehicle 102.

Figure 2:
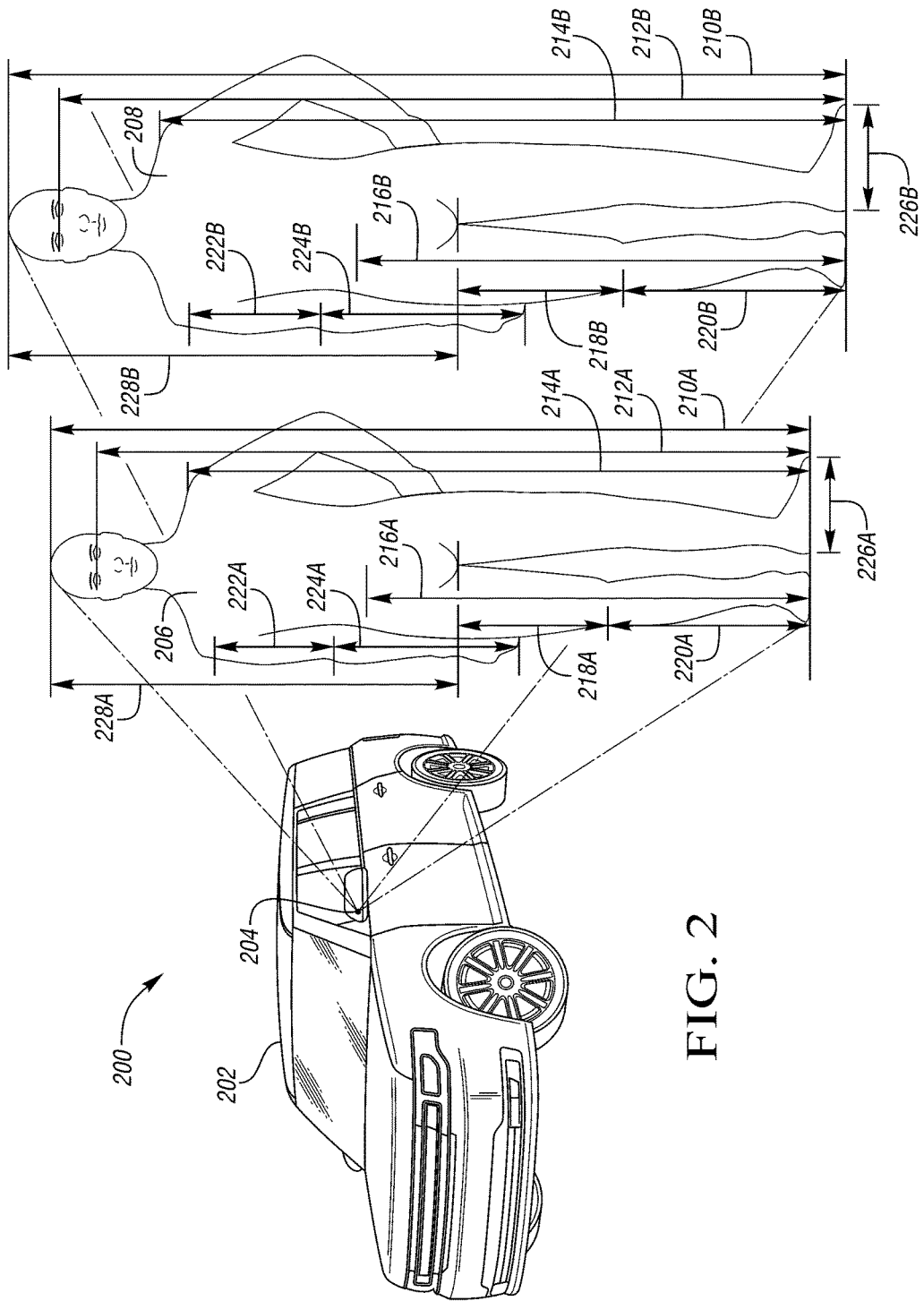
FIG. 2 is an exemplary illustration of a vehicle characterizing expected occupants by an external object detection module.

FIG. 2 is an exemplary illustration of an external object detection vehicle system 200 characterizing expected occupants 206, 208 and other occupants not shown proximate to the vehicle 102. For example, as an expected passenger 206 approaches the vehicle 102, a signal from a key fob or a signal from a vehicle keyless entry keypad is received by a controller in the vehicle. The controller activates an EODM 124 such as a side impact detection or blind spot detection system. The EODM 124 may gather data from many different sensors including vision or optical sensors, LiDAR, RADAR, ultrasonic and electromagnetic. These sensors may be mounted facing forward, backwards, or side mounted. Systems utilizing forward facing sensors include pedestrian detection, collision detection and adaptive cruise control. Systems utilizing backward facing sensors include pedestrian detection, park assist, rear collision detection, and back-up vision. Systems utilizing side mounted sensors include pedestrian detection, blind spot detection, and cross traffic detection. In this example, the EODM 124 records physical characteristics of an expected driver 206 positioned near the driver door and expected passengers 208 and other occupants not shown positioned near a driver side passenger door including a driver side rear passenger door. This example is for a 4-door vehicle. In a 4-door vehicle the rear seat is pivoted forward, usually manually, so a rear passenger can climb into the 3rd row seat.

Based on data gathered by the EODM 124 while the expected occupants 206, 208 and other occupants not shown are outside the vehicle, a controller may calculate anthropometric characteristics of the 2nd and 3rd row seating passengers. Also, the controller may use data representative of average anthropometric characteristics of a rear seat passenger. Anthropometric characteristics of a 2nd row passenger may include 2nd row passenger stature 210A, 2nd row passenger eye height 212A, 2nd row passenger shoulder height 214A, 2nd row passenger waist height 216A, 2nd row passenger upper leg length 218A, 2nd row passenger lower leg length 220A, 2nd row passenger upper arm length 222A, 2nd row passenger lower arm and hand length 224A, 2nd row passenger shoe size 226A and 2nd row passenger sitting height 228A. Similarly, anthropometric characteristics of a 3rd row passenger may include 3rd row passenger stature 210B, 3rd row passenger eye height 212B, 3rd row passenger shoulder height 214B, 3rd row passenger waist height 216B, 3rd row passenger upper leg length 218B, 3rd row passenger lower leg length 220B, 3rd row passenger upper arm length 222B, 3rd row passenger lower arm and hand length 224B, 3rd row passenger shoe size 226B and 3rd row passenger sitting height 228B.

Based on the data from the EODM 124, a seat module such as a rear seat module may adjust the position of the rear seat base and the angle of the rear seat back to maximize comfort for both 2nd and 3rd row seating passengers. The adjustment may include allocating greater emphasis to the 2nd row passenger preference and 2nd row passenger characteristics. However, the 3rd row passenger characteristics may still influence the 2nd row passenger seat position and 2nd row passenger seat back angle. Further, the EODM 124 may provide a count of individuals next to the vehicle 202 and in response to the number being greater than a predetermined number, activate a power folding seat module to deploy a seat to accommodate a passenger.

Figure 3:
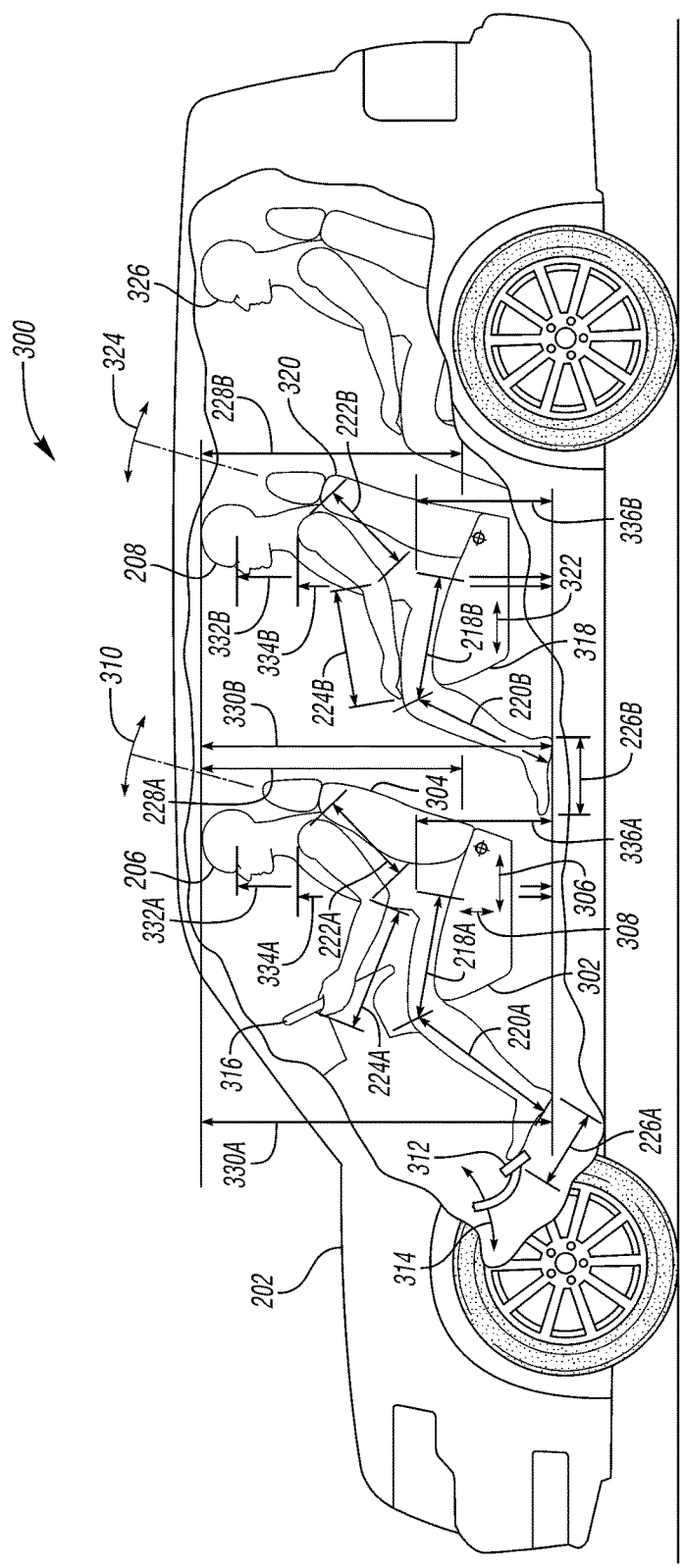
FIG. 3 is an exemplary illustration of a vehicle interior having 3 rows of seats adjusted based on expected occupants.

FIG. 3 is an exemplary illustration of an adjusted vehicle interior 300 having 3 rows of seats after adjustments based on expected occupants. For example, a 2nd row seat base 318 and 2nd row seat back 320 may be moved according to signals sent by the EODM 124 based on 2nd row seat passenger and 3rd row seat passenger characteristics. In which the 2nd row seat passenger characteristics such as 2nd row seat passenger stature 210B, 2nd row seat passenger eye height 212B, 2nd row seat passenger shoulder height 214B, 2nd row seat passenger waist height 216B, 2nd row seat passenger upper leg length 218B, 2nd row seat passenger lower leg length 220B, 2nd row seat passenger upper arm length 222B, 2nd row seat passenger lower arm and hand length 224B, 2nd row seat passenger shoe size 226B and 2nd row seat passenger sitting height 228B may be used along with vehicle data to estimate 2nd row seat passenger head room height 330B, 2nd row seat passenger eye height 332B, 2nd row seat passenger shoulder height 334B, and 2nd row seat passenger seat height 336B. Similarly, 3rd row seat passenger characteristics such as 3rd row seat passenger stature 210B, 3rd row seat passenger eye height 212B, 3rd row seat passenger shoulder height 214B, 3rd row seat passenger waist height 216B, 3rd row seat passenger upper leg length 218B, 3rd row passenger lower leg length 220B, 3rd row passenger upper arm length 222B, 3rd row passenger lower arm and hand length 224B, 3rd row passenger shoe size 226B and 3rd row passenger sitting height 228B may be used along with vehicle data to estimate 3rd row passenger head room height 228B, 3rd row passenger eye height, 3rd row passenger shoulder height, and 3rd row passenger seat height.

The 2nd row seat base 318 may be configured to provide translational motion 322 along a longitudinal axis of the vehicle 102 or may provide translational motion along a vertical axis of the vehicle. Also, the 2nd row seat back 320 may pivot 324 with the 2nd row seat base 318. Based on the 2nd row seat passenger data and the 3rd row seat passenger data, the 2nd row seat base 318 may move both longitudinal and vertical to maximize the leg room for both 2nd row seat passenger and 3rd row seat passenger directly behind the 2nd row seat passenger. And, the 2nd row seat back 320 may pivot 324 based on the 2nd row passenger data and the 3rd row passenger data. For safety and 2nd row seat passenger comfort, the driver may be able to override the automatic seat positioning made by the controller. Safety and comfort aspects for the 2nd row seat passenger include 2nd row seat passenger head room height 330B, 2nd row seat passenger eye height 332B, 2nd row seat passenger shoulder height 334B, and 2nd row seat passenger seat height 336B. Similarly, safety and comfort aspects for the 3rd row passenger include 3rd row passenger head room height, 3rd row passenger eye height, 3rd row passenger shoulder height, and 3rd row passenger seat height.

The controller may also adapt to situations including objects in a seat such as luggage or a child seat, and in such cases a driver may override all automatic seating movements.

Also, a 2nd row seat base 318 configured to provide translational motion 322 along a longitudinal axis of the vehicle 102 and a 2nd row seat back 320 configured to pivot 324 with the 2nd row seat base may move both longitudinally and pivotally based on the characteristics of the 2nd row passenger 208 and the 3rd row passenger.

Also, for example, a vehicle parked in a parking lot between two vehicles may detect that a 2nd row passenger 208 and a 3rd row passenger is approaching and adjust the $2^{nd}$ row seat accordingly. However, a passenger near the rear door of a four door vehicle may not be detected until the passenger opens the rear door. Here, the rear seat position may be compensated in response to a signal indicative of the opening of the rear vehicle door. Further, this compensation can be based on passenger size if known or a default compensation adjustment amount determined by test results and adjusted for varying cabin space, providing a reasonable default adjustment compensation figure. Likewise, if a rear seat passenger entry cannot be verified, detection of the rear door opening can be the trigger for a compensated seat position adjustment. Also, detection of movement of a $2^{nd}$ row seat back can be the trigger for deploying a $3^{rd}$ row seat and a compensated $2^{nd}$ row seat position adjustment.

In another example, a passive occupant detection system (PODS) or passenger seat weight detection system may be used to generate a compensated seat position adjustment based on passenger size estimations. Further, in the case of an object such as a grocery bag, purse or briefcase being placed in a rear seat, a controller may determine that a compensated 2nd row seat position is not required based on data from an EODM or PODS system.

The examples illustrated on the driver side of the vehicle are also applicable to a passenger side of the vehicle. Further, examples illustrated on the driver side of the vehicle are also applicable to a 2nd row seat when a passenger is expected to be seated directly behind in a 3rd row seat. Also, driver selection may be provided through an HMI coupled with the controller where seat position adjustment can be selectable based on optimal safety or a balance of safety and comfort. A vehicle operator may also select to disable or turn off the automatic seat adjustment system.

Key fob control may be enhanced to include a function that transmits at least one signal to the vehicle indicative of expected rear seat or third row passengers. For example, a person holding the key fob pushes the unlock button three times to indicate a third row passenger is approaching. The vehicle in response prepares the vehicle seats for third row seat entry position. The vehicle begins to observe passenger size prior to a passenger entering the vehicle, to determine appropriate seat position. In another example, an additional button is provided on a key fob that allows the key fob holder to press for unlock as traditional or to press an alternative button to indicate passengers entry. The passenger entry button can assume a single press to be two people in the front seat, two presses for front and back seat passengers and three presses indicative of a third row passenger. Here, the vehicle will prepare for the passengers in response to the at least one signal and record and process data to adjust for appropriate seat positions.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A blind-spot detection system for a vehicle comprising:
an optical sensor arrangement configured to, while the vehicle is moving, capture first data indicative of objects alongside the vehicle, and to, while the vehicle is stopped, capture second data indicative of an expected 3rd row passenger before the passenger enters the vehicle; and
at least one controller configured to output an alert in response to the first data, and to move a 2nd row seat to a riding position based on anthropometric characteristics of the passenger that are derived from the second data.

2. The system of claim 1, wherein the at least one controller is further configured to deploy, while the vehicle is stopped, a 3rd row seat.

3. The system of claim 1, wherein the optical sensor arrangement is further configured to, while the vehicle is stopped, capture third data indicative of an expected 2nd row seat passenger before the 2nd row seat passenger enters the vehicle, and the at least one controller is further configured to move the 2nd row seat to a riding position based on anthropometric characteristics of the 2nd row passenger and the 3rd row passenger that are derived from the second and third data.

4. The system of claim 3, wherein the optical sensor arrangement is further configured to, while the vehicle is stopped, capture fourth data indicative of an expected 1st row seat passenger before the 1st row seat passenger enters the vehicle, and the at least one controller is further configured to move the 2nd row seat to a riding position based on anthropometric characteristics of the 1st row passenger, 2nd row passenger and the 3rd row passenger that are derived from the second, third and fourth data.

5. The system of claim 1, wherein the at least one controller is further configured to activate, while the vehicle is stopped, the optical sensor arrangement in response to a signal from a key fob or detected movement of a rear door handle.

6. The system of claim 5, wherein the at least one controller further includes input channels configured to receive the first and second data, output channels configured to provide 2nd row seat position control commands to move the 2nd row seat, and control logic configured to generate the 2nd row seat position control commands based on the anthropometric characteristics of the expected 3rd row passenger.

7. The system of claim 1, wherein moving includes pivoting a seat back of the 2nd row seat or translating a base of the 2nd row seat.

8. A method comprising:
by a sensor arrangement, capturing data indicative of anthropometric characteristics of an expected 3rd row passenger prior to the passenger entering a vehicle; and
by a controller, deploying a 3rd row seat and moving a 2nd row seat prior to the expected 3rd row passenger entering the vehicle to a riding position that is based on the characteristics and 2nd row passenger data including anthropometric characteristics of a 2nd row passenger.

9. The method of claim 8, wherein the 2nd row passenger data includes average 2mnd row passenger anthropometric characteristics.

10. The method of claim 8, wherein moving the 2nd row seat includes pivoting a seat back of the 2nd row seat or translating a base of the 2nd row seat.

11. The method of claim 8, wherein the data includes measurements from a blind spot optical sensor, an ultrasonic sensor or a lidar sensor.

12. The method of claim 8, wherein the capturing is in response to a signal transmitted from a key fob or indicative of movement of a rear door handle.

13. The method of claim 8, wherein the 2nd row seat is a driver side 2nd row rear seat and the 3rd row seat is a driver side 3rd row seat.

14. A vehicle comprising:
a blind-spot detection system configured to output an alert in response to an object being detected alongside the vehicle while in motion, and to output data about an expected 3rd row passenger about to enter the vehicle while stopped; and
a controller configured to deploy a 3rd row seat and move a 2nd row seat to a riding position based on anthropometric characteristics of the passenger derived from the data.

15. The system of claim 14, wherein the blind-spot detection system is configured to output the data based on a signal transmitted from a key fob.

16. The system of claim 14, wherein the blind-spot detection system is configured to output the data in response to movement of a rear door handle.

17. The system of claim 14, wherein the data includes measurements based on average rear seat passengers anthropometric characteristics.

* * * * *